No. 824,243. PATENTED JUNE 26, 1906.
W. J. HOLLIER.
PROCESS OF TREATING FIBROUS STALKS.
APPLICATION FILED JUNE 5, 1905.

- Mechanically extracting bulk of gums, juices and moisture from green fibrous stalks and flattening out the stalks—preferably by crushing and pressing the stalks while they are still green.
- Binding stalks in bundles of convenient size.
- Thoroughly drying the stalks—preferably by atmospheric action.
- Decorticating the stalks to separate the fibre from the woody and other parts.

Witnesses
Gustave R. Thompson.
Frederick A. Holton.

Inventor
Walter J. Hollier,
by Mauro, Cameron, Lewis & Massie
Attorneys.

UNITED STATES PATENT OFFICE.

WALTER J. HOLLIER, OF NEW ORLEANS, LOUISIANA.

PROCESS OF TREATING FIBROUS STALKS.

No. 824,243.

Specification of Letters Patent.

Patented June 26, 1906.

Application filed June 5, 1905. Serial No. 263,883. Substituted for abandoned application filed May 7, 1902, Serial No. 106,343.

*To all whom it may concern:*

Be it known that I, WALTER J. HOLLIER, of New Orleans, Louisiana, have invented a new and useful Process of Treating Fibrous Stalks, which process is fully set forth in the following specification.

As is well known, retting is the prevailing method of treating fibrous stalks—such as hemp, ramie, and jute—preparatory to the decorticating operation, whereby the fibers are separated from the woody part of the stalks. As is also well known, retting, however performed, is attended by pestilential and obnoxious odors dangerous to health. It involves excessive handling of the stalks and incidental expense, and it impairs and injures the quality of the fiber obtained, particularly in strength and color. Dew-retting is most extensively practiced, particularly in the United States and Mexico. The green stalks are cut and allowed to remain spread out upon the ground in the fields. The dew ordinarily affords sufficient moisture to promote the retting, although in some instances it is necessary to sprinkle the stalks when the dew is insufficient. After the stalks have remained upon the ground for a number of days and been turned over a number of times the gums, pellicle, and woody part of the stalks will have rotted from the fibers, but not without injury to the latter. The manual labor and expense necessary to and the character of fiber produced by the retting method are such that it is only possible to handle the product of small acreages of land. In addition to those above mentioned there are other objections to the retting method which I need not here detail.

By treating the fibrous stalks of hemp, jute, ramie, or the like by the process constituting my present invention the objections to and the injurious effects of the retting method, as well as the pestilential and obnoxious odors attending the same, are completely avoided. Furthermore, a better quality of fiber is obtained at much less expense, it being possible to carry out the process almost entirely by machinery, but little handling of the stalks being required.

According to my process the green stalks are cut and while still green and before the juices and gums contained therein have hardened or set the stalks are crushed and subjected to pressure sufficient to squeeze out the bulk of the moisture, gums, and juices in a liquid state and to flatten out the woody part to which the fibers still adhere after removal of the gums and juices. It is thus possible to remove from sixty to eighty per cent. of the moisture, gums, and juices. The stalks are then bound in bundles of a size convenient for subsequent handling and for feeding to a suitable decorticating-machine, the efficiency of the operation of the latter being greatly facilitated by the previous crushing of the stalks. The steps of cutting, crushing, pressing, and binding the stalks in bundles can be most expeditiously and economically carried out at practically one operation by a machine analogous to the McCormick self-binding wheat-harvester with the addition of suitable crushing and pressing rollers or mechanism. Such a machine in traveling over a field will squeeze out and return to the earth the fertilizing juices previously removed therefrom by the plants. The crushing of the stalks thoroughly mashes and breaks the pellicle surrounding the fiber, opening up the stalk and facilitating the rapid absorption of the remaining moisture by the atmosphere. The subsequent action of the decorticating-machine reduces the dry pellicle to a powder, in which form it readily separates from the fiber, obviating the use of powerful acids for dissolving the same.

After the stalks have been bound in bundles they are allowed to remain in the field until thoroughly dry, fermentation and consequent rotting, weakening, and discoloration of the fiber being obviated by the previous elimination of the bulk of the fermentable moisture and juices, or instead of being allowed to dry out in the field the crushed, flattened, and pressed stalks may be stacked up in mows or warehouses. These are the preferred methods of drying. By drying the fibers while they are spread out upon the flattened woody part of the stalk, which is not removed until the subsequent decorticating operation, kinking and curling of the fibers are avoided. Should the fiber be separated from the wood while still green or before being dried, it would, in drying, contract and kink, and thus be rendered useless for most purposes. The decortication or separation of the woody stalk from the fiber may be effected at any time after the stalk is thoroughly dry without the quality of the fiber being impaired by the length of time intervening between the drying and decortication, provided, of course, that the stalks are properly protected from the elements.

It is of course to be understood that my invention is not restricted to the precise manner set forth above of carrying out my process. It may be carried out in a variety of ways, the principal feature of improvement being the crushing of the stalks and the mechanical extraction of the bulk of the gums, juices, and moisture while the stalks are green and the subsequent drying of the stalks, preferably by the action of the atmosphere, before decortication.

The accompanying drawing diagrammatically illustrates the process as preferably carried out.

What I claim is—

1. The herein-described process of separating the fiber of hemp, ramie and jute from stalks containing the same, consisting in mechanically extracting the bulk of the gums, juices and moisture from the stalks while they are still green, then thoroughly drying the stalks, and finally decorticating the stalks to separate the fiber from the woody and other parts.

2. The herein-described process of separating the fiber of hemp, ramie and jute from stalks containing the same, consisting in mechanically extracting the bulk of the gums, juices and moisture from the stalks by crushing and pressing the same while they are still green, then thoroughly drying the stalks and finally decorticating the stalks to separate the fiber from the woody and other parts.

3. The herein-described process of separating the fiber of hemp, ramie and jute from stalks containing the same, consisting in mechanically extracting the bulk of the gums, juices and moisture from the stalks by crushing and pressing the same while they are still green, then thoroughly drying the stalks by atmospheric action, and finally decorticating the stalks to separate the fiber from the woody and other parts.

4. The herein-described process of separating the fiber of hemp, ramie and jute from stalks containing the same, consisting in mechanically extracting the bulk of the gums, juices and moisture from the stalks by crushing and pressing the same while they are still green, binding the stalks in bundles, thoroughly drying the stalks and finally decorticating the stalks to separate the fiber from the woody and other parts.

5. The herein-described process of treating the stalks of hemp, ramie and jute, consisting in applying mechanical pressure to the stalks while they are still green, thereby flattening out the stalks and extracting the bulk of the gums, juices and moisture therefrom, and then thoroughly drying the stalks.

6. The herein-described process of treating the stalks of hemp, ramie and jute, consisting in applying mechanical pressure to the stalks while they are still green, thereby flattening out the stalks and extracting the bulk of the gums, juices and moisture therefrom, then thoroughly drying the stalks, and finally decorticating the stalks to separate the fiber from the woody and other parts.

7. The herein-described process of treating the stalks of hemp, ramie and jute, consisting in applying mechanical pressure to the stalks while they are still green, thereby flattening out the stalks and extracting the bulk of the gums, juices and moisture therefrom, and then thoroughly drying the stalks by atmospheric action.

8. The herein-described process of treating the stalks of hemp, ramie and jute, consisting in applying mechanical pressure to the stalks while they are still green, thereby flattening out the stalks and extracting the bulk of the gums, juices and moisture therefrom, binding the stalks in bundles, thoroughly drying the stalks, and finally decorticating the stalks to separate the fiber from the woody and other parts.

In testimony whereof I have signed this specification in the presence of two subscribing witnesses.

WALTER J. HOLLIER.

Witnesses:
M. R. SMITH,
E. MOFFITT.